United States Patent (10) Patent No.: US 7,898,663 B2
Wang et al. (45) Date of Patent: Mar. 1, 2011

(54) UNIFORM LIGHT GENERATING SYSTEM FOR TESTING AN IMAGE-SENSING DEVICE AND METHOD OF USING THE SAME

(75) Inventors: Bily Wang, Hsin Chu (TW); Kuei-Pao Chen, Hsin Chu (TW); Chih-Ming Wang, Hsinchu (TW)

(73) Assignee: Youngtek Electronics Corporation, Hsinchu (TW)

( * ) Notice: Subject to any disclaimer, the term of this patent is extended or adjusted under 35 U.S.C. 154(b) by 235 days.

(21) Appl. No.: 12/285,191

(22) Filed: Sep. 30, 2008

(65) Prior Publication Data
US 2009/0190124 A1 Jul. 30, 2009

(30) Foreign Application Priority Data
Jan. 30, 2008 (TW) .............................. 97103449 A

(51) Int. Cl.
*G01J 3/40* (2006.01)
*G01B 9/00* (2006.01)
(52) U.S. Cl. ...................................... 356/404; 356/124

(58) Field of Classification Search ......... 356/404–405, 356/121–124, 302, 71, 237.1–237.5, 326, 356/328; 250/224, 458.1, 226, 559.27, 559.41, 250/205; 362/231, 555
See application file for complete search history.

(56) References Cited
U.S. PATENT DOCUMENTS
2003/0223248 A1* 12/2003 Cronin et al. ............... 362/555
* cited by examiner

*Primary Examiner*—Sang Nguyen
(74) *Attorney, Agent, or Firm*—Rosenberg, Klein & Lee

(57) ABSTRACT

A uniform light generating system for testing an image-sensing device includes a light-generating unit, a light-transmitting unit, a light-diffusing unit, and a lens unit. The light-generating unit has a substrate and a plurality of light-emitting elements electrically disposed on the substrate. The light-transmitting unit has one side communicated with the light-generating unit for receiving and uniformizing light beams projected from the light-emitting elements. The light-diffusing unit has one side disposed on the other side of the light-transmitting unit for receiving and diffusing the light beams that have passed through the light-transmitting unit. The lens unit is disposed on the other side of the light-diffusing unit for transmitting the light beams that have passed through the light-diffusing unit to the image-sensing device.

20 Claims, 5 Drawing Sheets

UNIFORM LIGHT GENERATING SYSTEM FOR TESTING AN IMAGE-SENSING DEVICE AND METHOD OF USING THE SAME

BACKGROUND OF THE INVENTION

1. Field of the Invention

The present invention relates to a uniform light generating system and a method of using the same, and particularly relates to a uniform light generating system for testing an image-sensing device and a method of using the same.

2. Description of Related Art

In general, an integrating sphere has a hollow spheroid unit, and the hollow spheroid unit has a plurality of output holes and input holes formed thereon. Moreover, the integrating sphere has a reflective board arranged in the hollow spheroid unit, and a reflective coating layer is coated on an inner wall of the hollow spheroid unit.

Firstly, a pre-measuring light beam is projected into the hollow spheroid unit from input holes; next the light beam is reflected and refracted via the reflective board and the inner wall for generating a uniform light beam. The uniform light beam is then projected from the output holes for being measured. In this way, the integrating sphere is used to receive light beams and change the light beams into uniform light beams, and then project uniform light beams out from the output holes. Hence, a user can sample power, waveform and energy regarding the uniform light beam near the output hole for calculating original relevant parameters regarding projected light beams, such as LEDs.

SUMMARY OF THE INVENTION

The present invention provides a uniform light generating system for testing an image-sensing device and a method of using the same.

A first aspect of the present invention is a uniform light generating system for testing an image-sensing device, comprising: a light-generating unit, a light-transmitting unit, a light-diffusing unit, and a lens unit. The light-generating unit has a substrate and a plurality of light-emitting elements electrically disposed on the substrate. The light-transmitting unit has one side communicated with the light-generating unit for receiving and uniformizing light beams projected from the light-emitting elements. The light-diffusing unit has one side disposed on the other side of the light-transmitting unit for receiving and diffusing the light beams that have passed through the light-transmitting unit. The lens unit is disposed on the other side of the light-diffusing unit for transmitting the light beams that have passed through the light-diffusing unit to the image-sensing device.

A second aspect of the present invention is a method of using a uniform light generating system for testing an image-sensing device, comprising: projecting light beams from a light-generating unit, wherein the light-generating unit has a substrate and a plurality of light-emitting elements electrically disposed on the substrate; receiving and uniformizing the light beams projected from the light-emitting elements by a light-transmitting unit that has one side communicated with the light-generating unit; receiving and diffusing the light beams that have passed through the light-transmitting unit by a light-diffusing unit that has one side disposed on the other side of the light-transmitting unit; transmitting the light beams that have passed through the light-diffusing unit to the image-sensing device by a lens unit that is disposed on the other side of the light-diffusing unit; and judging the image-sensing quality of the image-sensing device by a comparison between the measurement information of the light beams that have passed through the light-transmitting unit, the light-diffusing unit and lens unit with the original information of the light beams projected from the light-generating unit.

It is to be understood that both the foregoing general description and the following detailed description are exemplary, and are intended to provide further explanation of the invention as claimed. Other advantages and features of the invention will be apparent from the following description, drawings and claims.

BRIEF DESCRIPTION OF THE DRAWINGS

The various objects and advantages of the present invention will be more readily understood from the following detailed description when read in conjunction with the appended drawings, in which.

DETAILED DESCRIPTION OF PREFERRED EMBODIMENTS

Figure 1:
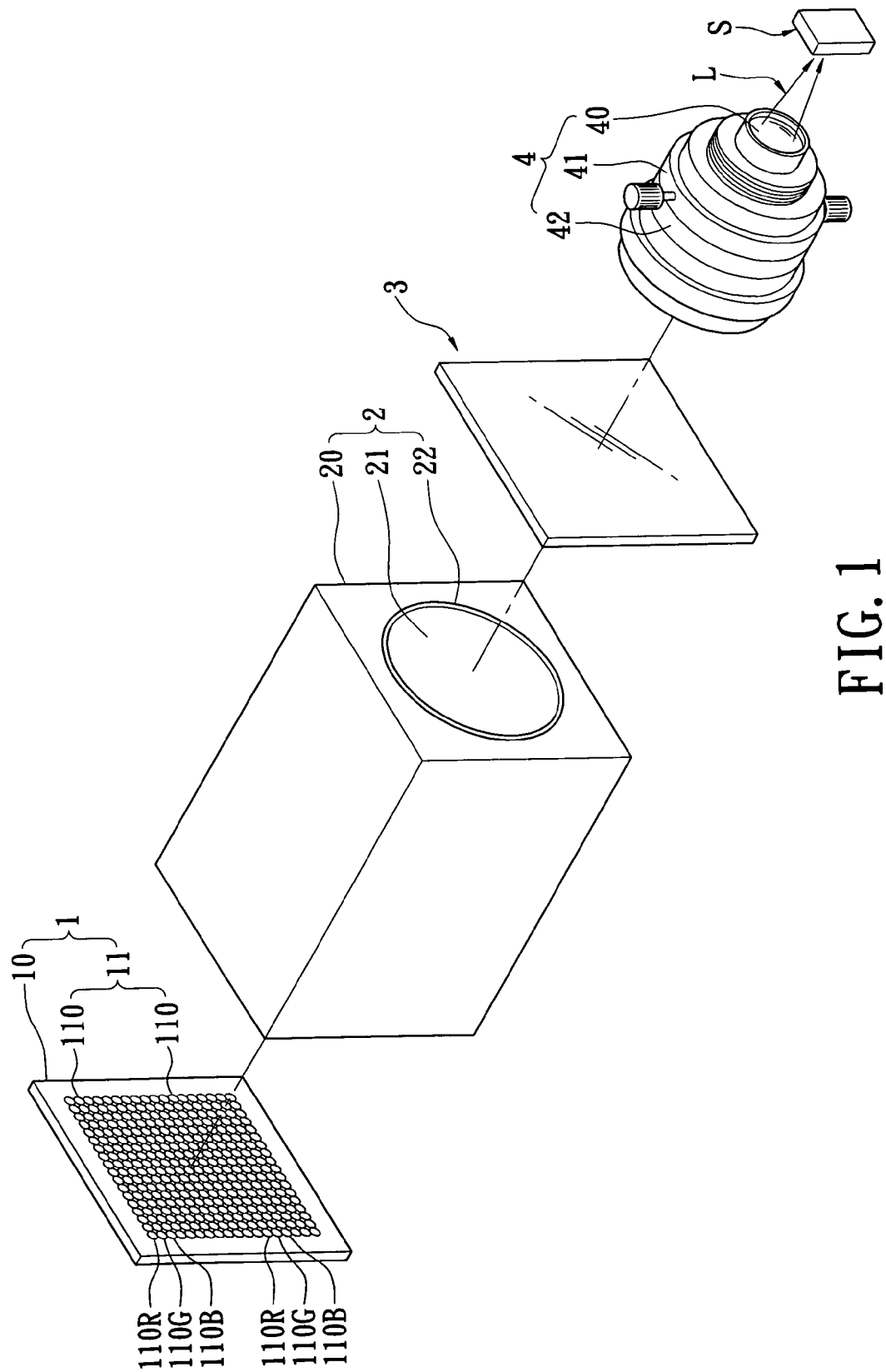
FIG. 1 is a perspective, schematic view of a uniform light generating system for testing an image-sensing device according to the present invention.
Figure 2:
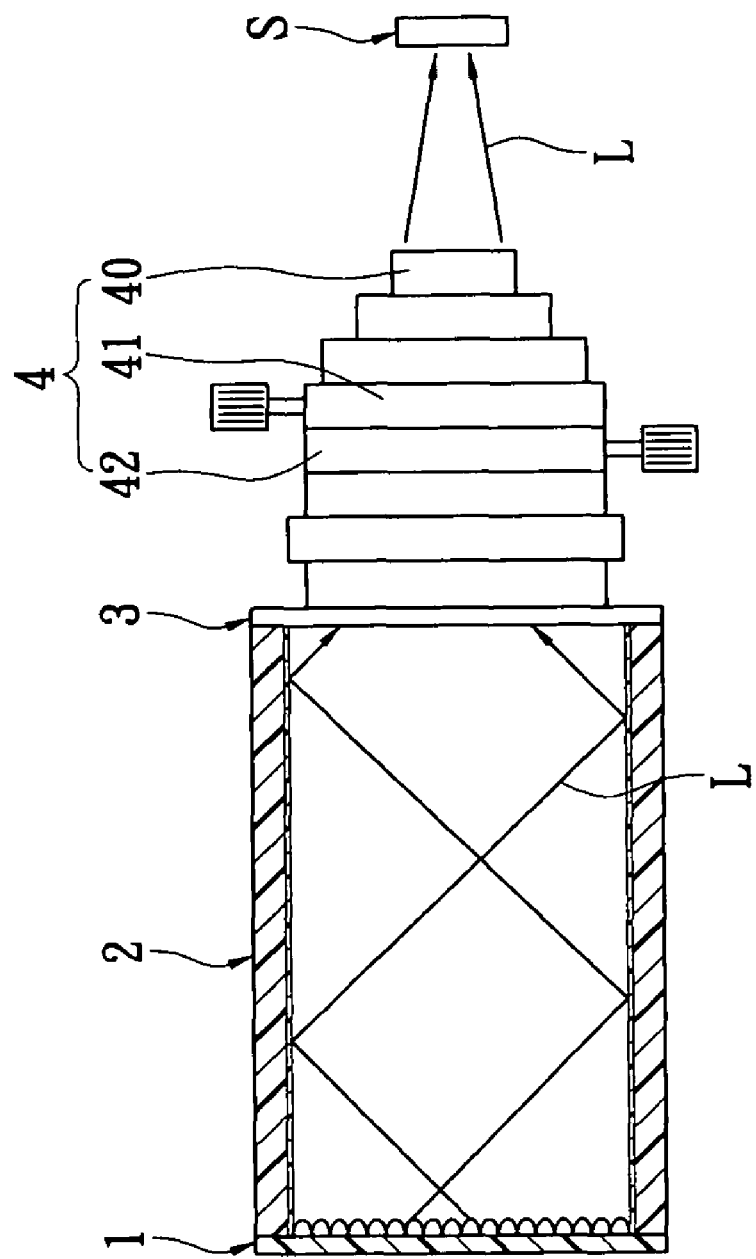
FIG. 2 is a side, schematic view of a uniform light generating system for testing an image-sensing device according to the present invention.

Referring to FIGS. 1 and 2, the present invention provides a uniform light generating system for testing an image-sensing device, including a light-generating unit 1, a light-transmitting unit 2, a light-diffusing unit 3, and a lens unit 4.

The light-generating unit 1 has a substrate 10 and a plurality of light-emitting elements 11 electrically disposed on the substrate 10. The light-emitting elements 11 are composed of a plurality of LEDs 110. In the present embodiment, the LEDs 110 are composed of a plurality of red LEDs 110R, a plurality of green LEDs 110G, and a plurality of blue LEDs 110B.

The light-transmitting unit 2 has a main body 20, a channel 21 passing through the main body 20, and a reflective coating layer 22 coated on an inner surface of the channel 21. One side of the light-transmitting unit 2 communicates with the light-generating unit 1 for receiving and uniformizing light beams L projected from the light-emitting elements 11. In other words, the red light beams R projected from the red LEDs 110R, green light beams G projected from the green LEDs 110G and blue light beams B projected from the blue LEDs 110B are mixed in the light-transmitting unit.

One side of the light-diffusing unit 3 is disposed on the other side of the light-transmitting unit 2 for receiving and diffusing the light beams L that have passed through the light-transmitting unit 2. The light-generating unit 1 and the light-diffusing unit 3 are disposed on two opposite sides of the main body 20 in order to seal two opposite sides of the channel 21.

The lens unit 4 includes a lens set 40, a focus adjusting element 41 for adjusting the focus of the lens set 40, and a depth-of-field adjusting element 42 for adjusting the depth-of-field of the lens set 40. The light beams L pass through the lens set 40 for generating scattered light or parallel light by matching the focus adjusting element 41 and the depth-of-field adjusting element 42 according to actual testing requirement. Hence, the lens unit 4 is disposed on the other side of the light-diffusing unit 3 for transmitting the light beams L that have passed through the light-diffusing unit 3 to the image-sensing device S.

Figure 3:
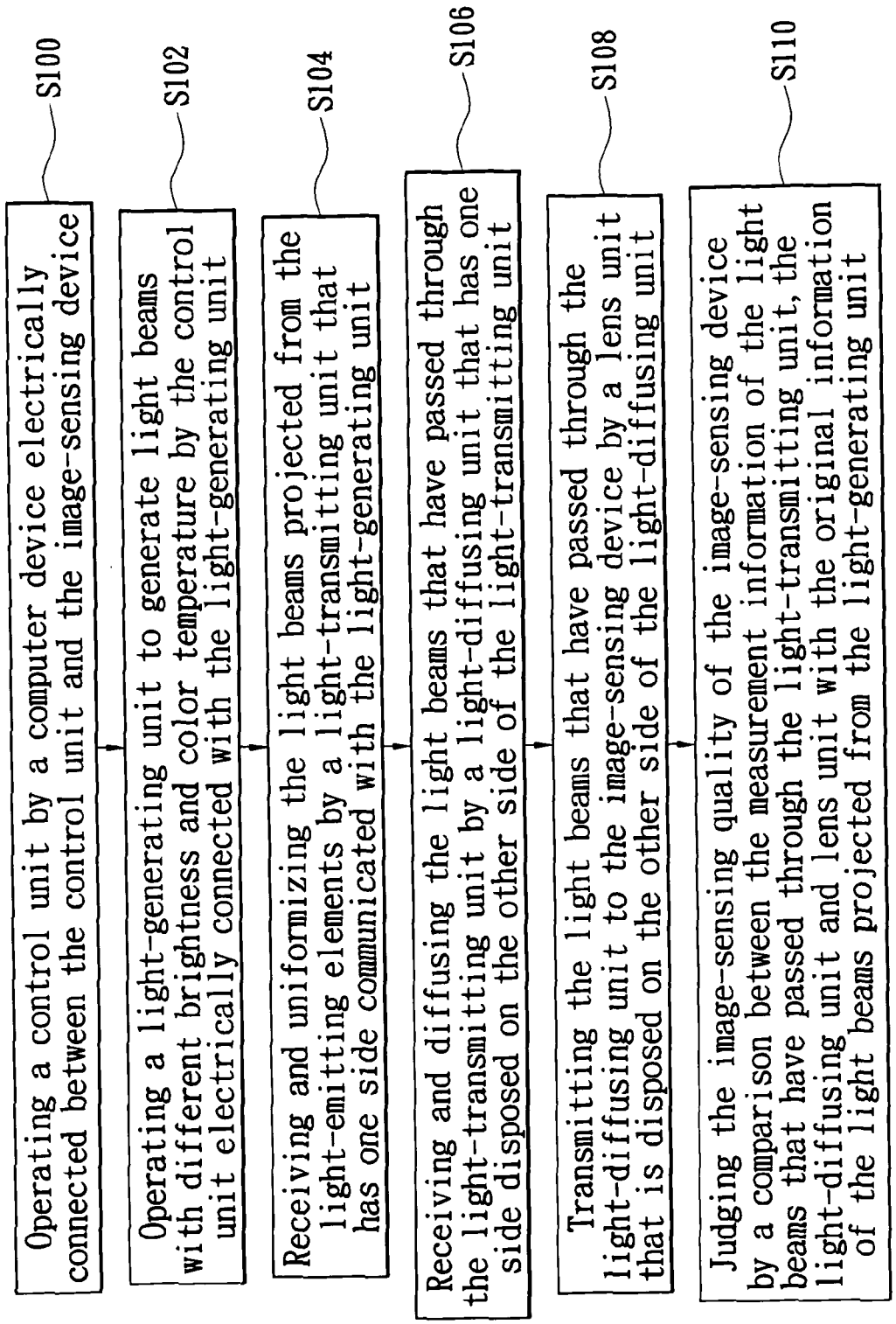
FIG. 3 is a flowchart of a method of using a uniform light generating system for testing an image-sensing device according to the present invention.
Figure 4:
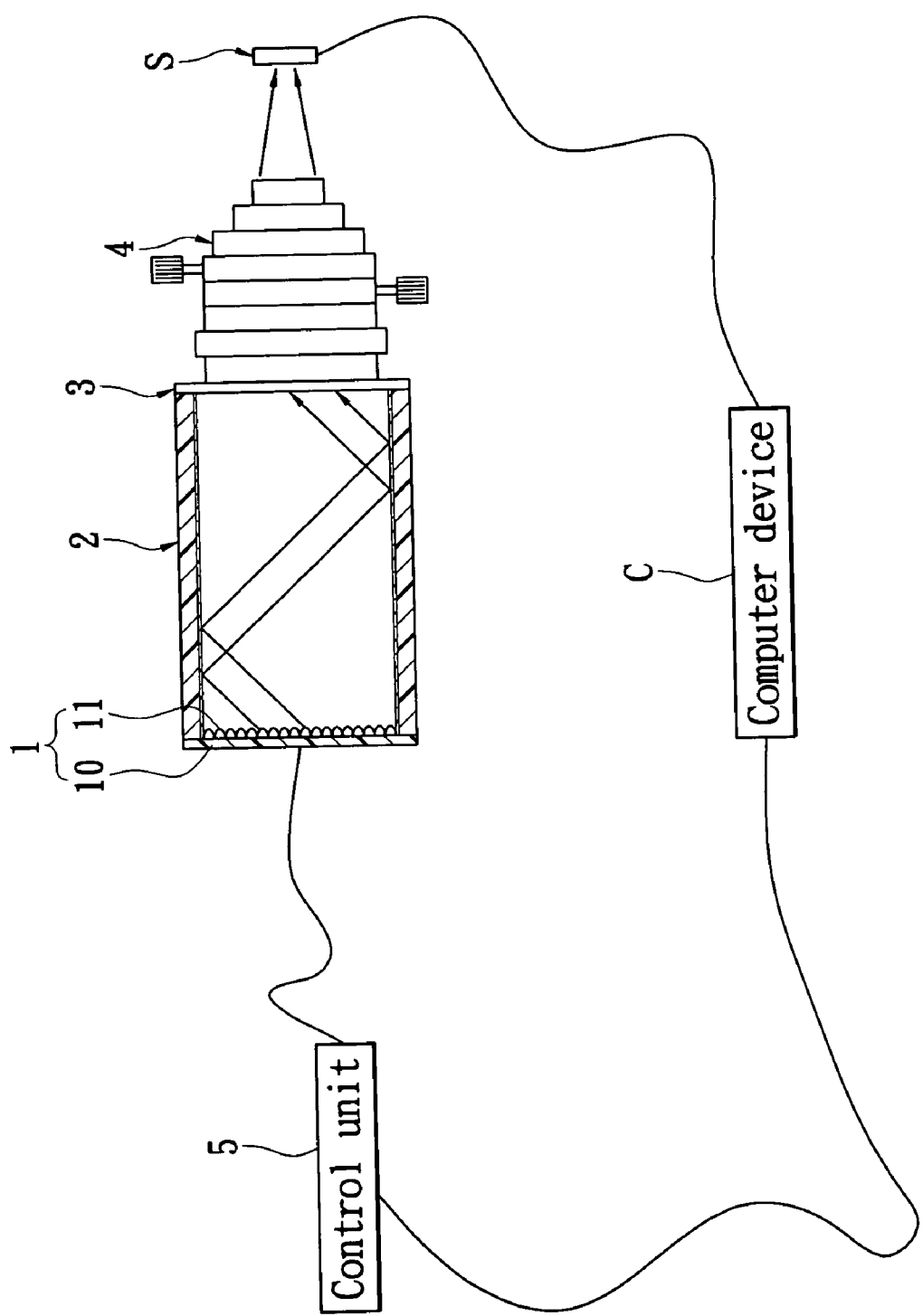
FIG. 4 is a schematic view of a method of using a uniform light generating system for testing an image-sensing device according to the present invention.

Referring to FIGS. 3 and 4, the present invention provides a method of using a uniform light generating system for testing an image-sensing device, including following steps:

Step S100 is: operating a control unit 5a by a computer device C electrically connected between the control unit 5 and the image-sensing device S.

Step S102 is: operating a light-generating unit 1 to generate light beams L with different brightness and color temperature by the control unit 5 electrically connected with the light-generating unit 1. The light-generating unit 1 has a substrate 10 and a plurality of light-emitting elements 11 electrically disposed on the substrate 10.

Step 104 is: receiving and uniformizing the light beams L projected from the light-emitting elements 11 by a light-transmitting unit 2 that has one side communicated with the light-generating unit 1.

Step 106 is: receiving and diff-using the light beams L that have passed through the light-transmitting unit 2 by a light-diffusing unit 3 that has one side disposed on the other side of the light-transmitting unit 2.

Step 108 is: transmitting the light beams L that have passed through the light-diffusing unit 3 to the image-sensing device S by a lens unit 4 that is disposed on the other side of the light-diffusing unit 3.

Step 110 is: judging the image-sensing quality of the image-sensing device S by a comparison between the measurement information of the light beams L that have passed through the light-transmitting unit 2, the light-diffusing unit 3 and lens unit 4 with the original information of the light beams L projected from the light-generating unit 1. In other words, the computer device C is used to compare the measurement information with the original information for judging the image-sensing quality of the image-sensing device S.

Figure 5:
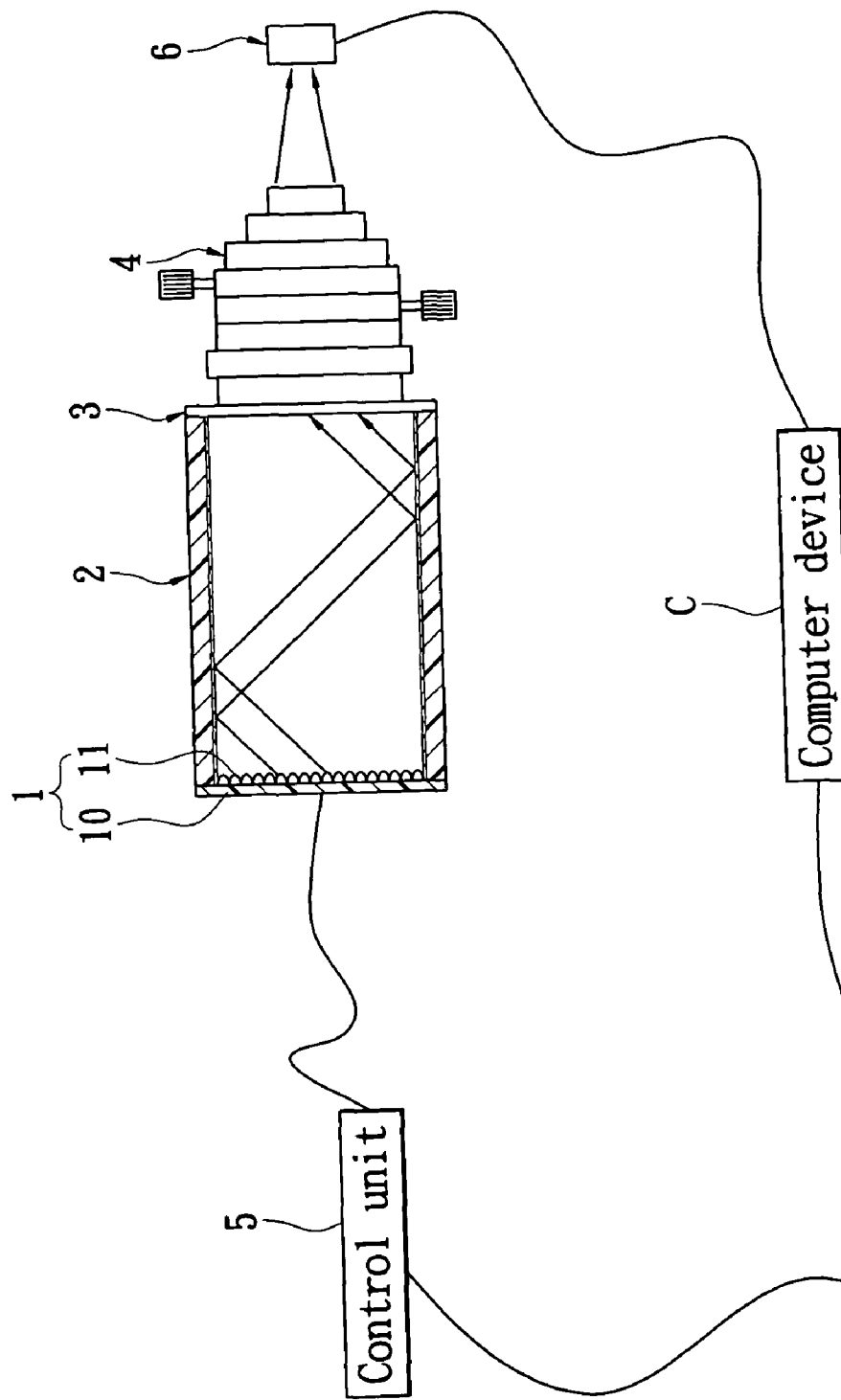
FIG. 5 is a schematic view of a uniform light generating system in use according to the present invention.

Referring to FIG. 5, when the light-generating unit 1 needs to be corrected, a lux meter 6 can be arranged on a predetermined area for measuring the light beams L that have passed through the light-transmitting unit 2, the light-diffusing unit 3 and lens unit 4. Hence, when the lux meter 6 is used to measure the light beams L that have passed through the light-transmitting unit 2, the light-diffusing unit 3 and lens unit 4 in order to obtain a real lux value, and a lux value generated by the light-generating unit 1 is corrected by comparing the lux value generated by the light-generating unit 1 with the real lux value. For example, the luminosity of the light-generating unit 1 will decay over time with use, but the above-mentioned correct method can solve the problem that the luminosity of the light-generating unit 1 will decay over time with use and the luminosity will be unstable.

Although the present invention has been described with reference to the preferred best molds thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A uniform light generating system for testing an image-sensing device, comprising:
   a light-generating unit having a substrate and a plurality of light-emitting elements electrically disposed on the substrate;
   a light-transmitting unit having one side communicated with the light-generating unit for receiving and uniformizing light beams projected from the light-emitting elements;
   a light-diffusing unit having one side disposed on the other side of the light-transmitting unit for receiving and diffusing the light beams that have passed through the light-transmitting unit; and
   a lens unit disposed on the other side of the light-diffusing unit for transmitting the light beams that have passed through the light-diffusing unit to the image-sensing device, wherein the lens unit includes a lens set, a focus adjusting element for adjusting the focus of the lens set, and a depth-of-field adjusting element for adjusting the depth-of-field of the lens set.

2. The uniform light generating system as claimed in claim 1, wherein the light-emitting elements are composed of a plurality of LEDs.

3. The uniform light generating system as claimed in claim 2, wherein the LEDs are composed of a plurality of red LEDs, a plurality of green LEDs, and a plurality of blue LEDs.

4. The uniform light generating system as claimed in claim 3, wherein red light beams projected from the red LEDs, green light beams projected from the green LEDs and blue light beams projected from the blue LEDs are mixed in the light-transmitting unit.

5. The uniform light generating system as claimed in claim 1, wherein the light-transmitting unit has a main body, a channel passing through the main body, and a reflective coating layer coated on an inner surface of the channel.

6. The uniform light generating system as claimed in claim 5, wherein the light-generating unit and the light-diffusing unit are disposed on two opposite sides of the main body in order to seal two opposite sides of the channel.

7. The uniform light generating system as claimed in claim 1, wherein the light beams pass through the lens set for generating scattered light or parallel light by matching the focus adjusting element and the depth-of-field adjusting element.

8. The uniform light generating system as claimed in claim 1, further comprising a control unit electrically connected with the light-generating unit in order to adjust the brightness and the color temperature of the light beams.

9. The uniform light generating system as claimed in claim 8, further comprising a computer device electrically connected between the control unit and the image-sensing device.

10. A method of using a uniform light generating system for testing an image-sensing device, comprising:
    projecting light beams from a light-generating unit, wherein the light-generating unit has a substrate and a plurality of light-emitting elements electrically disposed on the substrate;
    receiving and uniformizing the light beams projected from the light-emitting elements by a light-transmitting unit that has one side communicated with the light-generating unit;
    receiving and diffusing the light beams that have passed through the light-transmitting unit by a light-diffusing unit that has one side disposed on the other side of the light-transmitting unit;

transmitting the light beams that have passed through the light-diffusing unit to the image-sensing device by a lens unit that is disposed on the other side of the light-diffusing unit; and judging the image-sensing quality of the image-sensing device by a comparison between the measurement information of the light beams that have passed through the light-transmitting unit, the light-diffusing unit and lens unit with the original information of the light beams projected from the light-generating unit.

11. The method as claimed in claim 10, wherein the light-emitting elements are composed of a plurality of LEDs.

12. The method as claimed in claim 11, wherein the LEDs are composed of a plurality of red LEDs, a plurality of green LEDs, and a plurality of blue LEDs.

13. The method as claimed in claim 12, wherein red light beams projected from the red LEDs, green light beams projected from the green LEDs and blue light beams projected from the blue LEDs are mixed in the light-transmitting unit.

14. The method as claimed in claim 10, wherein the light-transmitting unit has a main body, a channel passing through the main body, and a reflective coating layer coated on an inner surface of the channel.

15. The method as claimed in claim 14, wherein the light-generating unit and the light-diffusing unit are disposed on two opposite sides of the main body in order to seal two opposite sides of the channel.

16. The method as claimed in claim 10, wherein the lens unit includes a lens set, a focus adjusting element for adjusting the focus of the lens set, and a depth-of-field adjusting element for adjusting the depth-of-field of the lens set.

17. The method as claimed in claim 16, wherein the light beams pass through the lens set for generating scattered light or parallel light by matching the focus adjusting element and the depth-of-field adjusting element.

18. The method as claimed in claim 10, wherein the uniform light generating system further comprises a control unit electrically connected with the light-generating unit in order to adjust the brightness and the color temperature of the light beams.

19. The method as claimed in claim 18, wherein the uniform light generating system further comprises a computer device electrically connected between the control unit and the image-sensing device in order to compare the measurement information with the original information for judging the image-sensing quality of the image-sensing device.

20. The method as claimed in claim 10, wherein the uniform light generating system further comprises a lux meter for measuring the light beams that have passed through the light-transmitting unit, the light-diffusing unit and lens unit in order to obtain a real lux value, and a lux value generated by the light-generating unit is corrected by comparing the lux value generated by the light-generating unit with the real lux value.

* * * * *